US008517356B2

(12) United States Patent
Yang et al.

(10) Patent No.: US 8,517,356 B2
(45) Date of Patent: Aug. 27, 2013

(54) VENTILATION DEVICE AND CONTROLLING METHOD OF THE SAME (75) Inventors: Tae Man Yang, Changwon-si (KR); Jeong Hun Kim, Changwon-si (KR); Hyung Ho Park, Changwon-si (KR)

(73) Assignee: LG Electronics Inc., Seoul (KR)

( * ) Notice: Subject to any disclaimer, the term of this patent is extended or adjusted under 35 U.S.C. 154(b) by 454 days.

(21) Appl. No.: 12/789,675

(22) Filed: May 28, 2010

(65) Prior Publication Data
US 2010/0300649 A1 Dec. 2, 2010

(30) Foreign Application Priority Data

May 29, 2009 (KR) .......................... 10-2009-0047442

(51) Int. Cl.
B01F 3/04 (2006.01)

(52) U.S. Cl.
USPC .............................. 261/154; 261/70; 261/104

(58) Field of Classification Search
USPC .................. 261/140.1, 141, 154, 49, 58, 70, 261/104, 107
See application file for complete search history.

(56) References Cited

U.S. PATENT DOCUMENTS

| 1,883,778 | A | * | 10/1932 | Freeman | 261/104 |
| 3,136,829 | A | * | 6/1964 | Skerritt | 261/104 |
| 3,977,364 | A | * | 8/1976 | Gijsbers et al. | 122/366 |
| 4,148,334 | A | * | 4/1979 | Richards | 137/389 |
| 4,362,090 | A | * | 12/1982 | Whiteley | 454/231 |
| 5,079,934 | A | * | 1/1992 | Vinokurov | 62/304 |
| 5,162,088 | A | * | 11/1992 | Peng et al. | 261/27 |
| 5,578,113 | A | * | 11/1996 | Glenn | 96/52 |
| 5,771,845 | A | | 6/1998 | Pistien et al. | |
| 5,975,502 | A | * | 11/1999 | Stanek et al. | 261/23.1 |
| 6,000,684 | A | * | 12/1999 | Pasch et al. | 261/104 |
| 6,095,505 | A | * | 8/2000 | Miller | 261/130 |
| 6,189,869 | B1 | * | 2/2001 | Stanek et al. | 261/23.1 |

FOREIGN PATENT DOCUMENTS

| EP | 0 504 205 | 6/1994 |
| EP | 0 708 900 | 12/1998 |
| JP | 4306435 | 10/1992 |
| JP | 4320743 | 11/1992 |
| JP | 5248669 | 9/1993 |
| JP | 6180133 | 6/1994 |
| JP | 2008-241109 | 10/2008 |
| JP | 2008-241124 | 10/2008 |

OTHER PUBLICATIONS

European Search Report dated Jan. 17, 2013.

* cited by examiner

Primary Examiner — Charles Bushey
(74) Attorney, Agent, or Firm — KED & Associates, LLP (57) ABSTRACT A ventilation device and a controlling method of the same are provided. The ventilation device may include a humidifier having improved humidification efficiency and improved durability.

16 Claims, 10 Drawing Sheets

VENTILATION DEVICE AND CONTROLLING METHOD OF THE SAME

CROSS-REFERENCE TO RELATED APPLICATION(S)

This application claims priority under 35 U.S.C. §119 to Korean Application No. 10-2009-0047442, filed in Korea on May 29, 2009, whose entire disclosure is incorporated herein by reference.

BACKGROUND

1. Field

This relates to a ventilation device, and in particular, to a ventilation device including a humidifier having improved efficiency and durability, and a controlling method of the same.

2. Background

In general, ventilation devices exhaust contaminated internal air to the outdoors and draw fresh external air into a designated space, such as, for example, an indoor room. An air conditioner without a ventilation function cools or heats internal air, and recirculates the internal air, to cool or heat a room. Although such an air conditioner includes a filter and the like, indoor air contamination will increase gradually unless an air cleaning function and a ventilation function is provided.

BRIEF DESCRIPTION OF THE DRAWINGS

The embodiments will be described in detail with reference to the following drawings in which like reference numerals refer to like elements wherein.

DETAILED DESCRIPTION

An air conditioner configured to cool and heat a room may be provided with an auxiliary ventilation device. Such a ventilation device may include a heat exchanger configured to perform heat-exchange between air drawn in from the outdoors and air exhausted from an indoor space to reduce heat loss. The ventilation device may include a humidifier that performs a humidification function to humidify air supplied from outdoors. Such a humidifier may include at least one wicking device that absorbs fluid, such as, for example, water, and propagates, or wicks, the fluid therealong in a predetermined direction.

In such a humidifier, an end of the wicking device absorbs fluid stored in a supply tank and the fluid flows along the wicking device in a predetermined direction. However, because the fluid flows only in the predetermined direction, fluid may be wasted during the humidifying process. That is, the actual amount of fluid that is vaporized and supplied to the designated space together with the supplied air may be impacted by the amount of fluid that is not vaporized. If the amount of fluid flowing along the wicking device after being absorbed at the end thereof increases, and the end becomes relatively saturated, foreign substances may accumulate on a surface of the wicking device, thus shortening a usage life of the wicking device.

Figure 1:
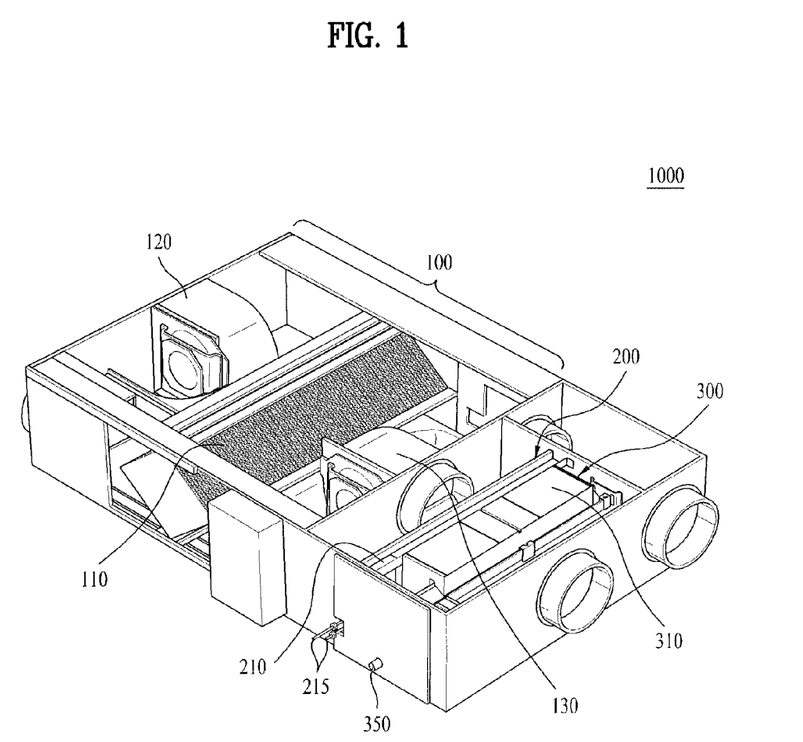
FIG. 1 is a perspective view of a ventilation device as embodied and broadly described herein.

As shown in FIG. 1, a ventilation device 1000 as embodied and broadly described herein may include a ventilator 100 including a heat exchanger 110 and a humidifier 300 having first and second fluid supply tanks 320 and 330, one or more supply pipes 360 and 370 and a wicking device 310. The first and second supply tanks 320 and 330 may be provided at different heights. The supply pipe 370 may connect the first and second supply tanks 320 and 330. The wicking device 310 may absorb fluid stored in the first and/or second supply tank 320 and 330 so as to humidify air supplied from the ventilator 100 as it passes therethrough.

The ventilation device 1000 shown in FIG. 1 includes the ventilator 100, at least one of a heater/cooler 200 configured to heat or cool the supplied air from the ventilator 100, and the humidifier 300 configured to humidify air from the ventilator 100. The heater/cooler 200 and the humidifier 300 may improve comfort and the quality of air supplied to the designated space.

Simply for ease and completeness of discussion, the ventilation device 1000 shown in FIG. 1 includes both the heater/cooler 200 and the humidifier 300.

In the embodiment shown in FIG. 1, the ventilator 100 includes a supply fan 130 and an exhaust fan 120 that supply external air to and exhaust internal air from the ventilator 100, respectively. The supply fan 130 and the exhaust fan 120 may be located at opposite ends of the ventilator 100. For example, the supply fan 130 may be provided at an indoor end and the exhaust fan 120 may be provided at an outdoor end thereof. A heat exchanger 110 may be provided between the supply fan 130 and the exhaust fan 120 to allow the supplied air and the exhausted air to heat-exchange with each other, to prevent radical changes in temperature of internal air, and to lower an air load.

For example, if a ventilation process is implemented while cooling the designated space, (relatively) cooled internal air is exhausted and hot external air is drawn in such that a cooling load (air load) on the air conditioner may increase. As a result, the air supplied by the heat exchanger 110 and air exhausted by the heat exchanger 110 heat-exchange with each other to reduce the cooling load (or heating load when in a heating mode). As a result, a temperature difference sensed within the designated space being cooled (or heated) may be reduced as much as possible.

In certain embodiments, the supply fan 130 and the exhaust fan 120 may be cross flow fans and the heat exchanger 110 may be located between the supply fan 130 and the exhaust fan 120.

The supply fan 130 draws external air (supplied air) having passed through the heat exchanger 110 toward the heater/ cooler 200 and the exhaust fan 120 exhausts internal air (exhausted air) having passed through the heat exchanger 110 to the outdoors.

The supplied air drawn by the supply fan 130 may be blown toward the heater/cooler 200. The heater/cooler 200 may include a heating/cooling coil 210 and an expanding valve. Refrigerant is evaporated or condensed in the heating/cooling coil 210 to heat or cool the supplied air. Refrigerant passing through the heating/cooling coil 210 may be supplied by an external source, such as, for example, an outdoor unit of an air conditioner that is independent from the ventilation device 1000. Although it is possible to install a compressor and a heat exchanger in the ventilation device 1000, refrigerant may be supplied by such an outdoor unit to reduce the volume of the ventilation device 1000 and noise generation, and to improve heating and cooling efficiency.

The humidifier 300 may be provided to a rear of the heater/cooler 200. The humidifier 300 may include the wicking device 310 to allow fluid to be absorbed and to wick therealong so as to humidify air passing therethrough.

Figure 2:
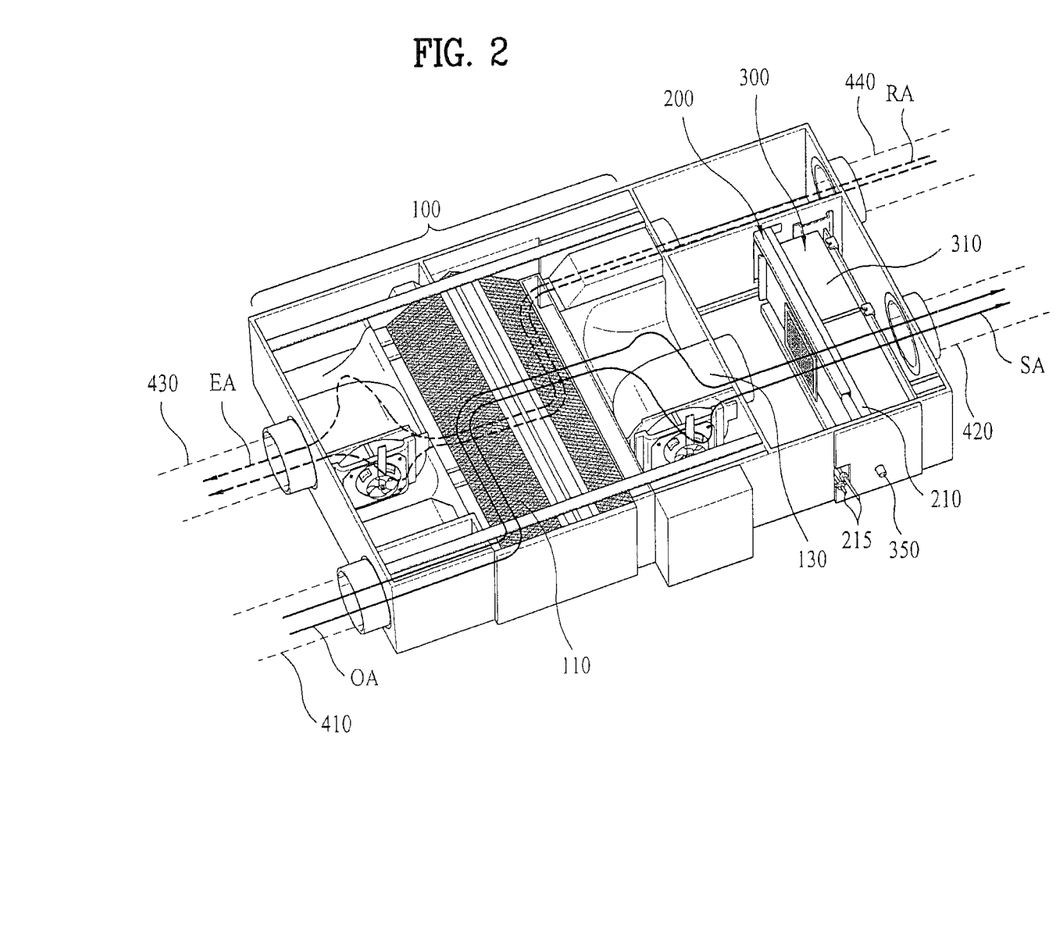
FIG. 2 is another perspective view of the ventilation device shown in FIG. 1.

As shown in FIG. 2, the ventilation device 1000 may include first and second exhaust ducts 430 and 440 and first and second supply ducts 410 and 420.

After the supplied air (OA) drawn into the ventilation device 1000 via the first supply duct 410 heat-exchanges in the heat exchanger 110, the supplied air is cooled or heated in the heating/cooling coil 210 and then humidified in the humidifier 300 and supplied to the designated space, such as, for example, an indoor room (SA).

The temperature thereof is decreased and the humidity thereof is increased in the humidifier 300 to improve characteristics of air supplied to the indoor room, as the supplied air heated/cooled by the heater/cooler 200 passes through the humidifier 300. For example, in winter, air heated in the heater/cooler 200 may be humidified in the humidifier 300 to adjust (lower) the temperature and heighten the humidity of the heated dry air in a heating mode. In contrast, internal air (RA) from the indoor room bypasses the humidifier 300 and/or the heater/cooler 200 and is heat-exchanged in the heat exchanger 110 before being exhausted to the outdoors (EA).

Figure 3A:
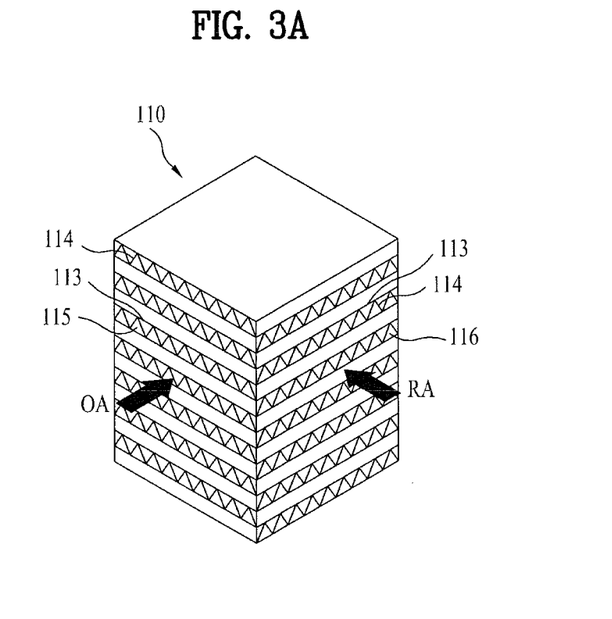
FIGS. 3A-3B are perspective views of a heat exchanger and a heating/cooling coil of the ventilation device shown in FIGS. 1 and 2.
Figure 3B:
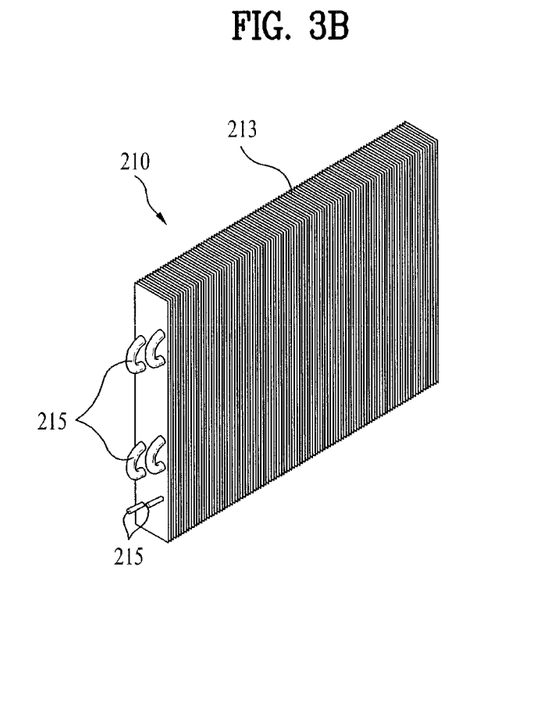

FIG. 3(A) illustrates the heat exchanger 110 and FIG. 3(B) illustrates the heating/cooling coil 210. As shown in FIG. 3(A), the heat exchanger 110 may include alternately arranged planar plate materials 113 and wave-shaped corrugated plate materials 114. The corrugated plate materials 114 positioned between two plane plate materials 113 may be alternated perpendicularly. That is, corrugation of a first corrugated plate 114 may be oriented in a first direction, and those of a second corrugated plate 114, which is separated from the first by a planar plate 113, may be oriented in a second direction that is perpendicular to the first direction, as shown in FIG. 3A. The heat exchanger 110 may have a square column shape, as shown in FIG. 3A, or other shape as appropriate.

A first path 115 and a second path 116 may be formed in the heat exchanger 110 by the multi-layered alternating structure of the plane plate materials 113 and the corrugated plate materials 114. In the embodiment shown in FIG. 3A, the first and second paths 115 and 116 cross with each other.

An absorbent material may be coated on a surface of the plane plate material 113 or the corrugated plate material 114 of the heat exchanger 110. This absorbent material may be, for example, silica gel, zeolite, ion exchange resin, or other material as appropriate. The surface of the plane plate material 113 or the corrugated plate material 114 may be configured of a thin film having absorbent material coated thereon such that the air flowing along the first and second paths 115 and 116 may exchange moisture, together with the heat exchange therebetween.

That is, if the air exhausted (RA) from the indoor room flows along the second path 116 and the supplied air (OA) drawn in from the outdoors flows along the first path 115, as shown in FIG. 3A, moisture from the exhausted air (RA) may be absorbed in the second path 116 by the absorbent, and may be supplied to the supplied air (OA) of the first path 115 so that the humidity of the supplied air (OA) may be increased accordingly. If the humidifier 300 is provided in the ventilation device 1000, the humidifying process may be implemented by the humidifier 300. However, the arrangement shown in FIG. 3A allows the humidity difference between the supplied (OA) and the exhausted air (RA) to be initially reduced in the heat exchanger 110.

The heater/cooler 200 shown in FIG. 3B may include the heating/cooling coil 210 having a plurality of fins 213 and refrigerant pipes 215 passing through the fins 213 and the expansion valve. The heating/cooling coil 210 may be a cross-fin type fin-tube-heat-exchanger, or other arrangement as appropriate. The plurality of fins 213 may be made of a metal, such as, for example, Aluminum, with a refrigerant pipe 215 passing through the fins 213. An expansion valve may selectively supply refrigerant to the heating/cooling coil 210. The expansion valve may be, for example, an electric expansion valve (EEV) so as to selectively control the supply of the refrigerant, or it may expand the refrigerant drawn into the heating/cooling coil 210. As a result, when cooling the indoor room, the heating/cooling coil 210 may be operated as evaporator, and when heating the indoor room, it may be operated as a condenser. The ventilation device 1000 may be operated in communication with a separate air conditioner, and the ventilation device 1000 may be supplied refrigerant by an outdoor unit of the air conditioner if a compressor and the like are not provided therein.

Figure 4A:
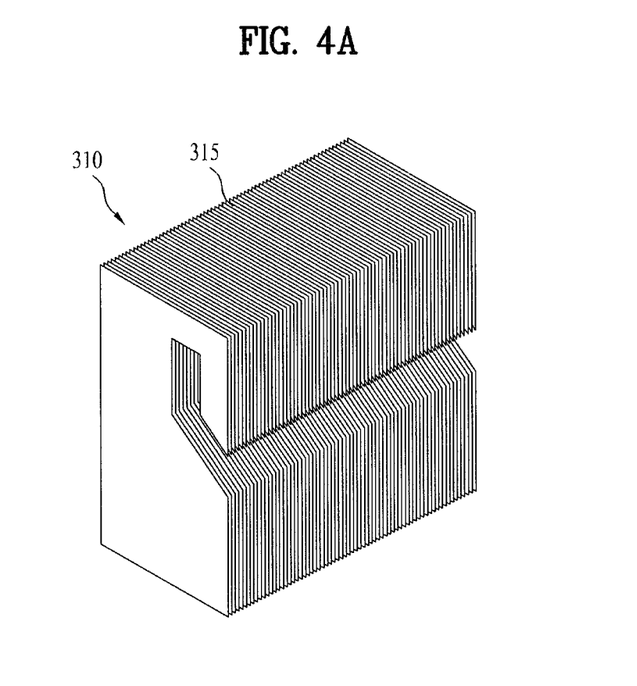
FIGS. 4A-4B illustrate a wicking device of the ventilation device shown in FIGS. 1 and 2.

As shown in FIG. 4A, the humidifier 300 may include the wicking device 310 that absorbs fluid and also allows the absorbed fluid to flow between layers thereof during the humidifying process. In certain embodiments, the wicking device 310 may have an overall cube-shape and may be formed by a plurality of moisture-absorbing layers 315. In alternative embodiments, the wicking device 310 may be formed of non-woven fabric such that fluid absorbed by the wicking device 310 may flow along surface(s) of the wicking device 310 or be absorbed in the moisture-absorbing layers 315 so as to only flow downward. The wicking device 310 may include a bent part 312 that extends downward from an upper end of the wicking device 310.

Figure 4B:
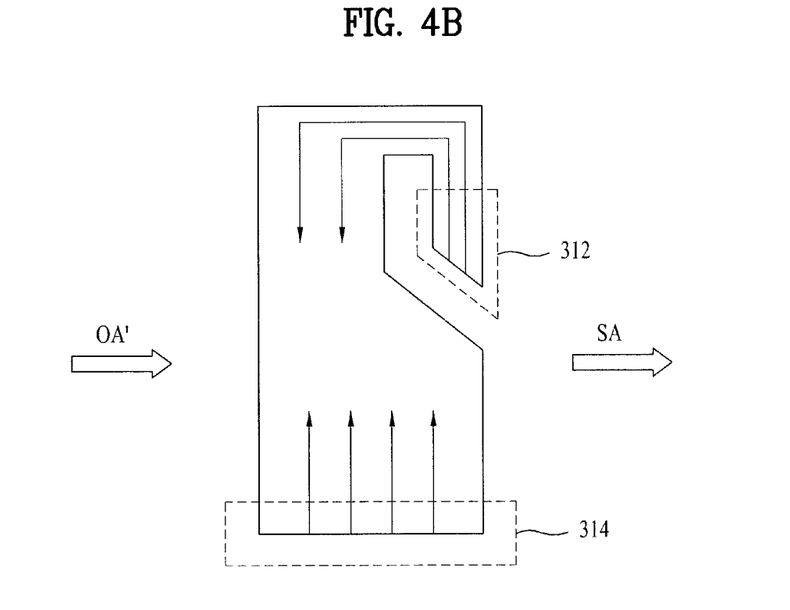

In the side-view of the humidifying member 310 shown in FIG. 4B, both a lower end 314 and the bent part 312 of the wicking device 310 may absorb fluid. The supplied air (OA) heated or cooled after heat-exchange in the heat exchanger 110 and the heating/cooling coil 210 is humidified while flowing through the wicking device 310 in a predetermined direction that is perpendicular to the absorbing direction of the fluid. The air is then supplied to the indoor room (SA).

Because these two portions of the wicking device 310 absorb fluid, an overall amount of fluid consumed by the wicking device 310, and saturation in these two areas, may be reduced and usage life of the wicking device 310 may be lengthened. The wicking device 310 may absorb fluid from at least two independent supply tanks, which will be described later.

Figure 5A:
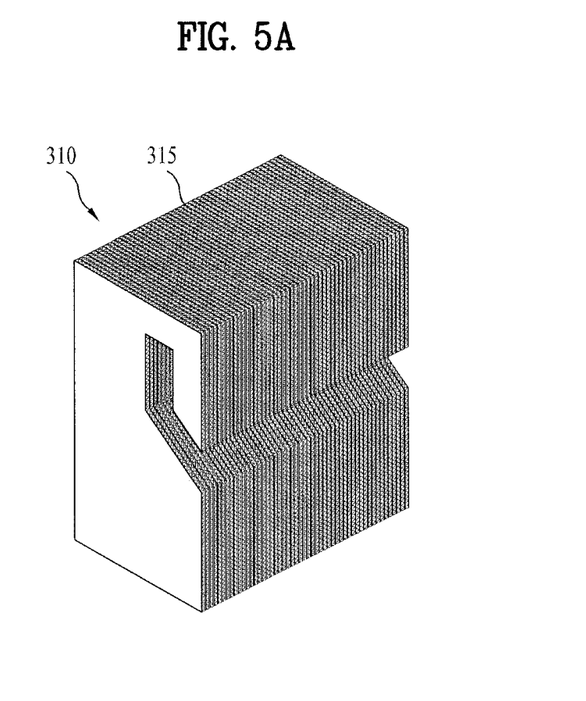
FIGS. 5A-5B illustrate a wicking device of a ventilation device according to another embodiment as broadly described herein.
Figure 5B:
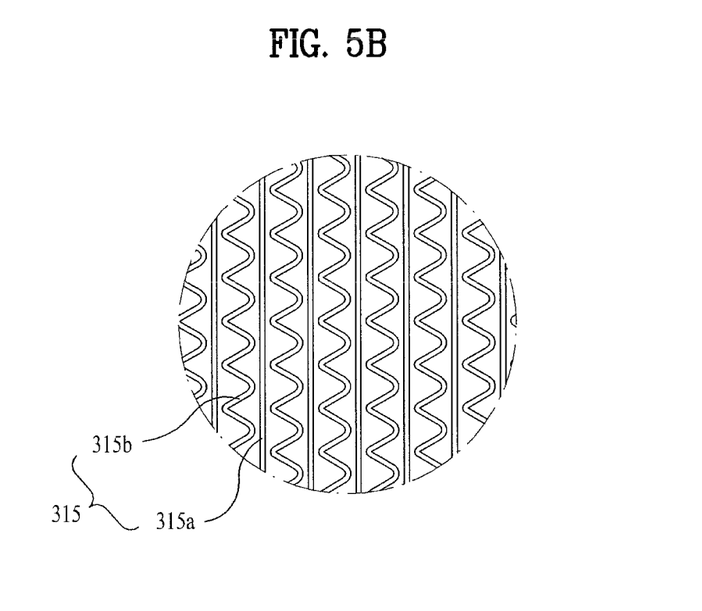

The wicking device 310 shown in FIG. 5A has a predetermined shape similar to the wicking device 310 shown in FIG. 4A. However, as shown in FIG. 5B, the moisture-absorbing layers 315 may include alternately arranged planar moisture-absorbing materials 315a and corrugated moisture-absorbing materials 315b. The planar moisture-absorbing materials 315a and the corrugated moisture-absorbing materials 315b may be repeatedly and alternatively stacked, with a predetermined space therebetween so that the absorbed fluid may flow along these surfaces of the humidifying member 310 (i.e., longitudinally) more efficiently.

The corrugated moisture-absorbing materials 315b can generate an effect of extending the flow path of the fluid flowing along the surface. This allows humidifying capacity to be increased without actually increasing the height/size of the wicking device 310 and the humidifier 301 (and thus the ventilation device 1000). The corrugated moisture-absorbing materials 315b also force the fluid flowing along the surface to follow a corrugated path. This forces the absorbed fluid to stay in the humidifying member 310 longer, thus improving capacity and efficiency.

In certain embodiments, the distance between adjacent plane moisture-absorbing materials 315a may be 5 mm or less and the distance between adjacent corrugated moisture-absorbing materials 315b may be 9 mm or less. As shown in FIGS. 4A-4B and 5A-5B, the wicking device 310 may be flat-panel-shaped with respect to a predetermined direction in which the air that has been heat-exchanged in the heat exchanger 110 of the ventilator 100 flows. That is, in certain embodiments, the air flowing through the wicking device 310 may flow in a direction substantially perpendicular to the fluid flowing along the wicking device 310, and substantially perpendicular to its flat panel face.

Figure 6:
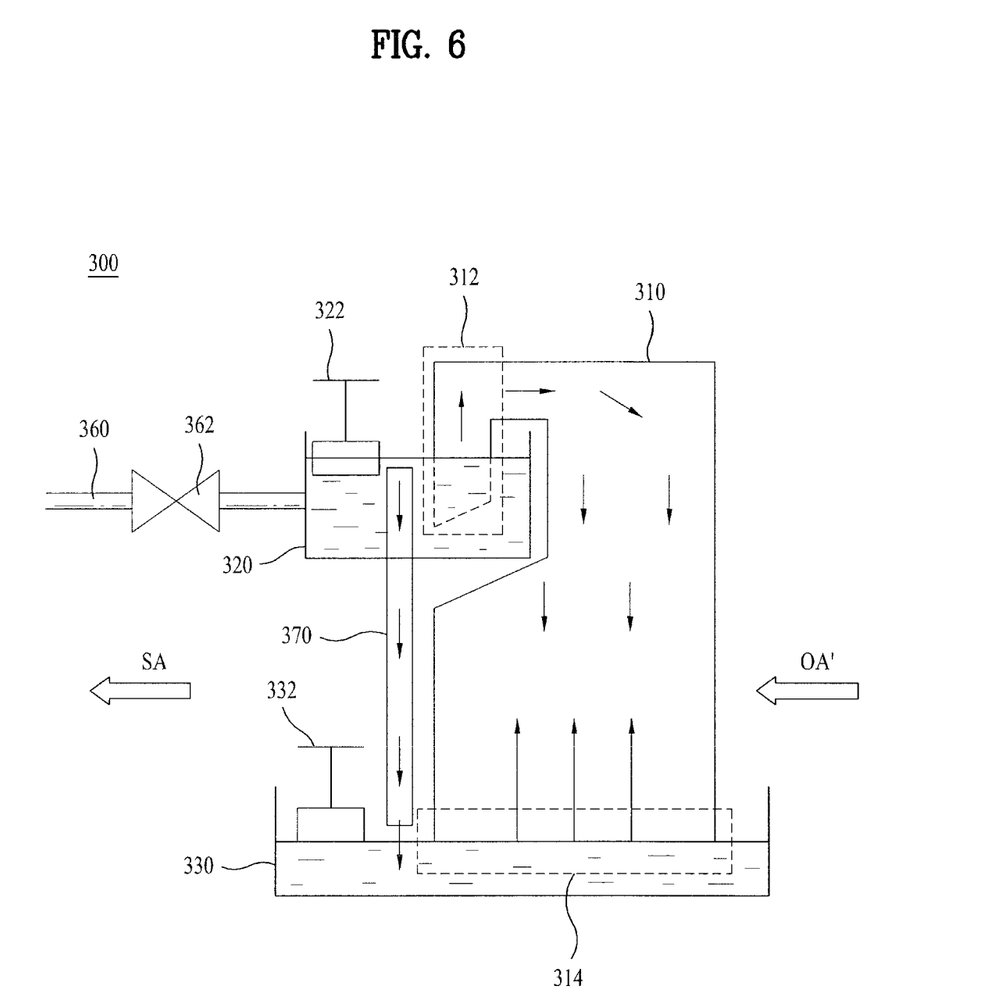
FIG. 6 is a diagram of a humidifier of the ventilation device according to an embodiment as broadly described herein.

As shown in FIG. 6, both the bent part 312 and the lower end 314 of the wicking device 310 may absorb fluid from first and second supply tanks 320 and 330, respectively. The first and second supply tanks 320 and 330 may have open top faces to allow the bent part 312 and the lower end 314 of the wicking device 310 to extend therein so as to absorb fluid held therein.

As shown in FIG. 6, a supply pipe 370 may be provided in communication with the first and second supply tanks 320 and 330 to supply fluid in a direction shown by the arrows. In the embodiment shown in FIG. 6, the first and second supply tanks 320 and 330 are located in predetermined positions so as to allow the bent part 312 and the lower end 314 of the wicking device 310 to absorb the fluid held therein. For example, the bent part 312 and the lower end 314 of the wicking device 310 may be located on the first and second supply tanks 320 and 330, respectively. The first supply tank 320 is supplied fluid from an external system. When fluid supplied to the first supply tank 320 exceeds a predetermined level, the supply pipe 370 supplies the excess fluid to the second supply tank 330, which is located below the first supply tank 320.

That is, the first supply tank 320 is provided above the second supply tank 330 so that fluid absorbed by the humidifying member 310 may be supplied to the first supply tank 320. The supply pipe 370 connects the first and second supply tanks 320 and 330 with each other in a vertical direction fluid supplied in excess of the predetermined level of the first supply tank 320 may be supplied to the second supply tank 330 via the supply pipe 370.

In certain embodiments, the first and second supply tanks 320 and 330 may include first and second fluid level sensors 322 and 332, respectively, as shown in FIG. 6. The sensors may be, for example, a float switch, or other sensing device as appropriate.

A supply valve 362 may be provided to regulate flow through a supply pipe 360 that selectively supplies fluid to the first supply tank 320. For example, when the fluid level of the first supply tank 320 sensed by the fluid level sensor 322 reaches a preset value, the supply valve 362 may be controlled to be closed, and when the fluid level is less than or equal to a preset value, it may be controlled to be open. Fluid supply may be controlled by the valve 362 in a similar manner based on the fluid level of the second supply tank 330, either alone or in conjunction with the first supply tank 320.

If it is assumed that the first and second fluid level sensors 322 and 332 are provided in the first and second supply tanks 320 and 330, at least one of the fluid levels of the first and second supply tanks 320 and 330 is greater than the preset highest value with the supply valve 362 being open, and thus the supply valve 362 may be closed accordingly. If both of the fluid levels of the first and second supply tanks 320 and 330 are lowered to less than or equal to the preset lowest value, with the supply valve 362 closed, the supply valve 362 may be opened.

It is advantageous to prevent overflow of the supply tanks 320 and 330. However, fluid may be supplied at the lowest value or more for efficient fluid supply to the wicking device 310. As a result, the lowest fluid levels to the first and second supply 320 and 330 tanks may be the lowest levels which still allow the wicking device 310 to absorb fluid from the first and second supply tanks 320 and 330. Such a lowest fluid level of the first supply tank 320 may be, for example, a level corresponding to a lower end of the bent part 312 according to an embodiment shown in FIG. 7, and, as shown in FIG. 8, the lowest level of the first supply tank 320a may be, for example, a level allowing an upper end of the wicking device 310 to absorb all of the fluid held therein. That is, the lowest fluid level in the embodiment shown in FIG. 8 may be 'zero'. As a result, the lowest fluid level may be variable, based on a fluid supply type.

As shown in FIG. 6, an upper end of the supply pipe 370 may be the same height or higher than the lowest fluid level of the first supply tank 320 with the bent part 312 of the wicking device 310 positioned therein.

The supply valve 362 may be closed when the fluid in the supply tank exceeds the preset fluid level, or when operation of the ventilation device 100 is stopped.

As mentioned above, fluid supplied to the first supply tank 320 in excess of the preset level is moved to the second supply tank 330 by the supply pipe 370. Also, when fluid is supplied over the preset fluid level, the first fluid level sensor 322 operates to stop the supply of fluid and prevent overflow. In this case, the second fluid level sensor 332 may also be operated to stop the supply of fluid and prevent overflow. As a result, the supply valve 362 selectively opens or closes the supply pipe 360 based on the level sensed by the first and second fluid level sensors 322 and 332.

In the embodiment shown in FIG. 7, the humidifier 300 may include a drain pan 340 provided below the second supply tank 330. If the fluid supply is not properly controlled because of, for example, malfunction of the supply valve 362, the drain pan 340 may prevent the fluid from overflowing. In addition, a drainage pipe 350 may drain the fluid collected in the drain pan 340. The drainage pipe 350 may be connected with an external facility, or it may be detachable.

In the embodiment shown in FIG. 8, a wicking device 310a of the humidifier 300a has a cube-shape, without a bent part formed at its upper end. As a result, a first supply tank 320a may be placed on a top of the wicking device 310a so that the upper end 312a of the wicking device 310a is able to absorb fluid from the first supply tank 320a.

To facilitate this, a plurality of supply holes may be formed in a lower surface of the first supply tank 320a, spaced apart a predetermined distance from each other along a width direction of the wicking device 310a. Alternatively, at least one supply slit may be formed in the lower surface of the first supply tank 320a along the width direction of the wicking device 310a, to supply fluid thereto. The first supply tank 320a does not necessarily have an open top structure because the wicking device 310a shown in FIG. 8 does not have a bent portion to be inserted therein.

The area of the supply hole or slit formed in the lower surface of the first supply tank 320a may be a predetermined size and/or shape. For example, if the pressure of the fluid absorbed from the first supply tank 320a makes it so that fluid is not absorbed from the second supply tank 330a, with the fluid level inside the second supply tank 320a increasing, this may indicate that the area of the supply hole or slit is too large, and thus the area may be reduced/adjusted as appropriate.

In the embodiment shown in FIG. 8, a supply pipe 370a may connect the supply tanks 320a and 330a to supply fluid from the higher supply tank to the lower supply tank. The supply pipe 370a may have a bent-shape, as shown in FIG. 8.

Figure 7:
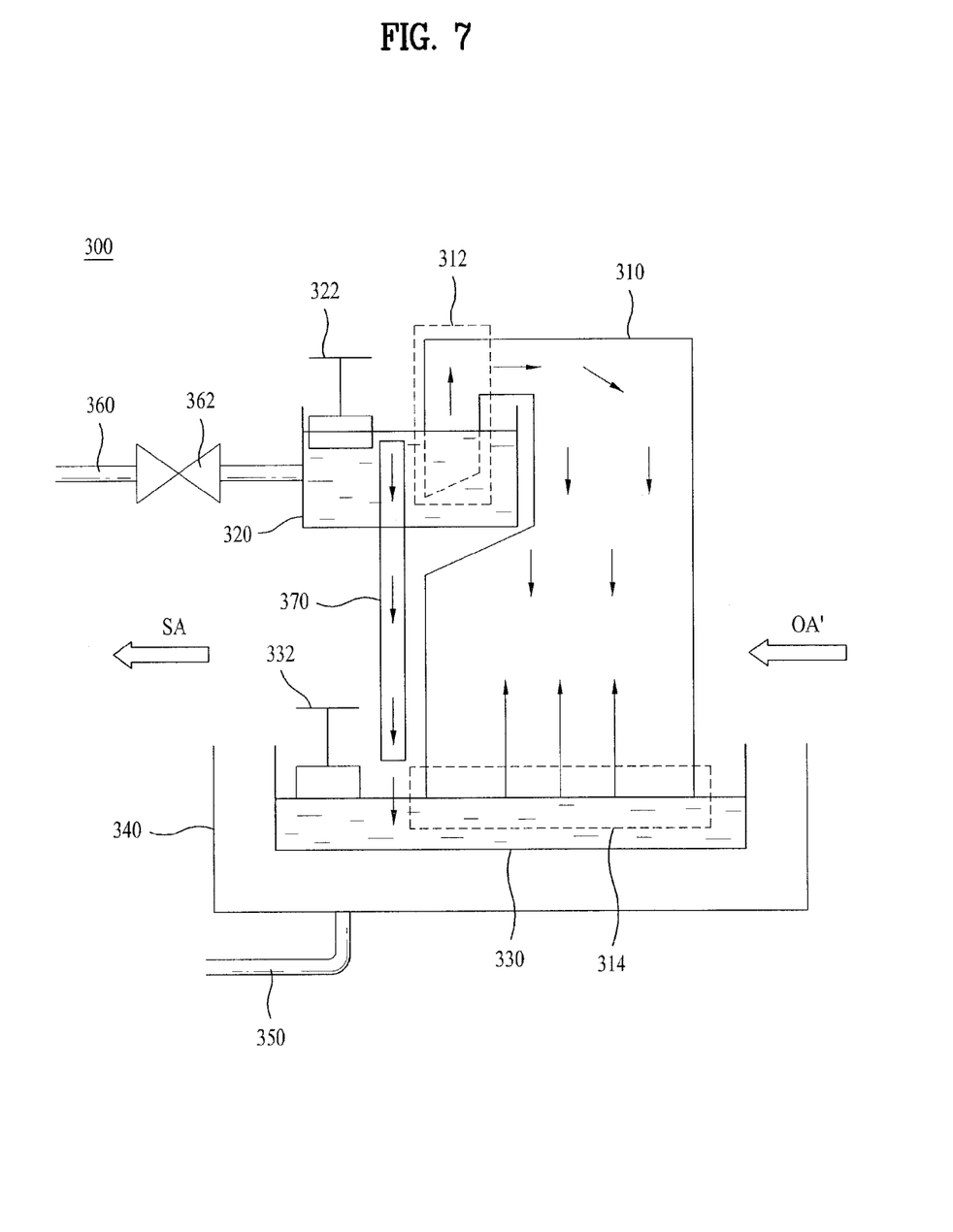
FIG. 7 is a diagram of a humidifier according to another embodiment as broadly described herein.
Figure 8:
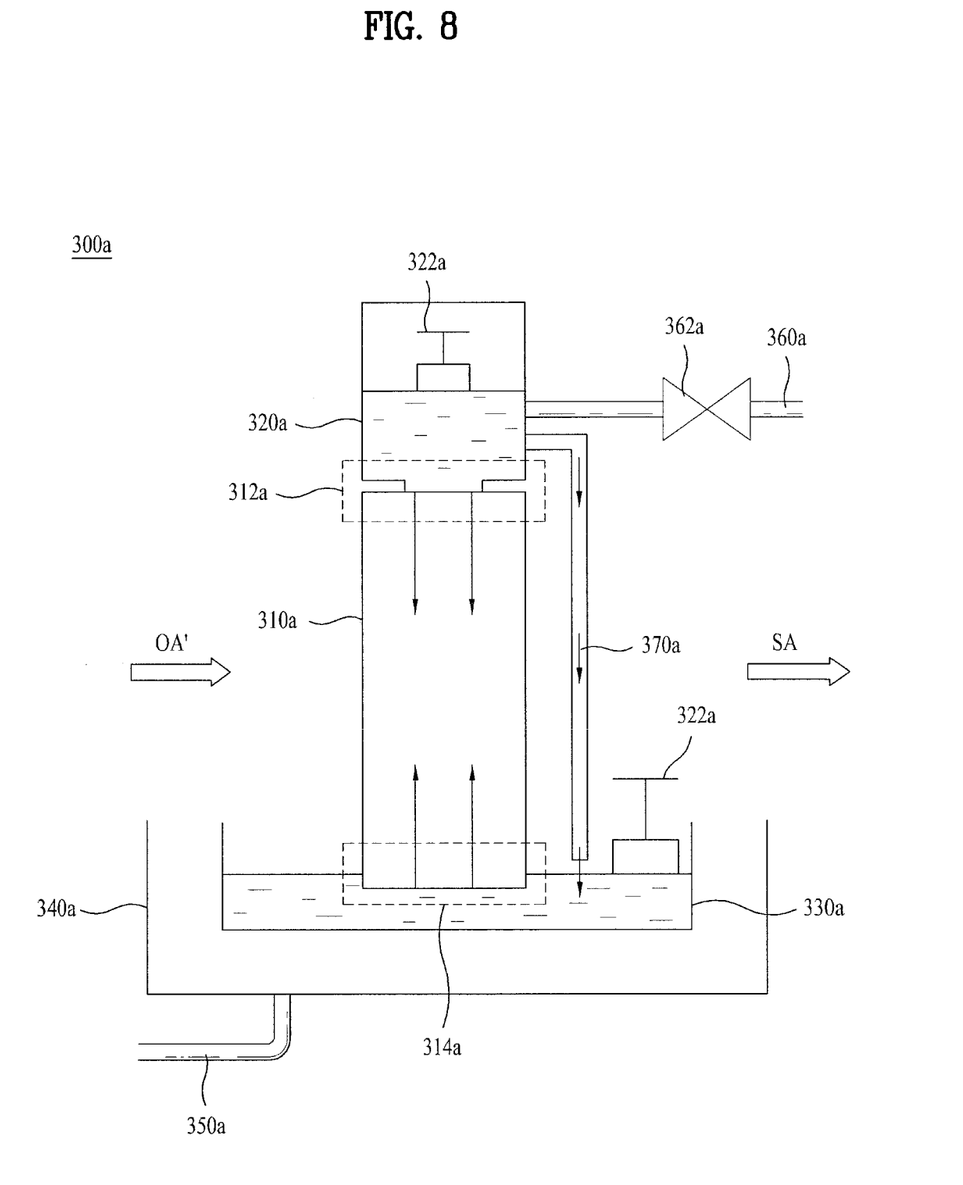
FIG. 8 is a diagram of a humidifier according to another embodiment as broadly described herein.
Figure 9A:
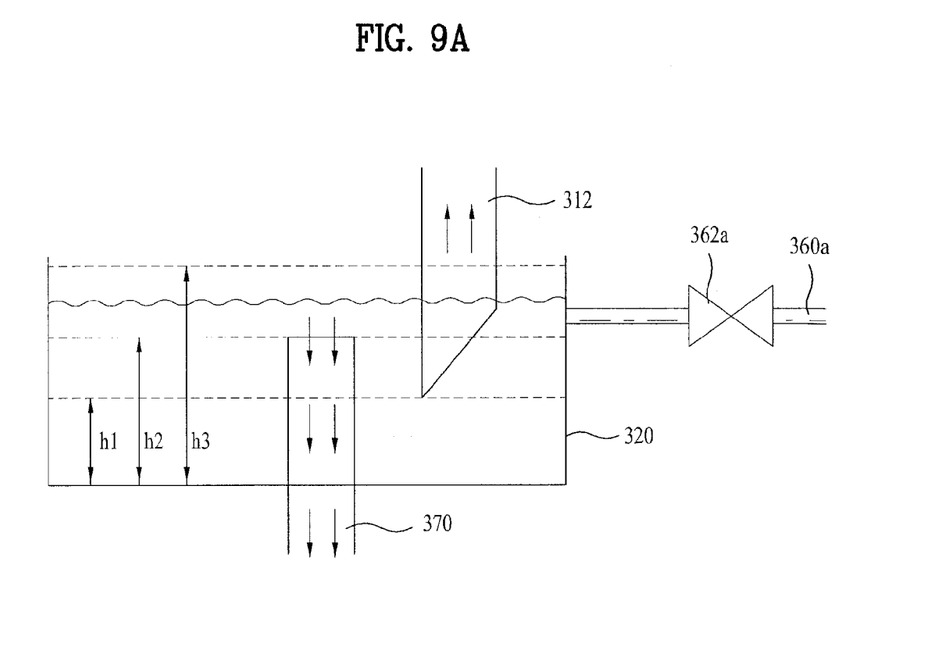
FIGS. 9A-9B illustrate a relationship between the wicking device and a fluid level of a supply tank.
Figure 9B:
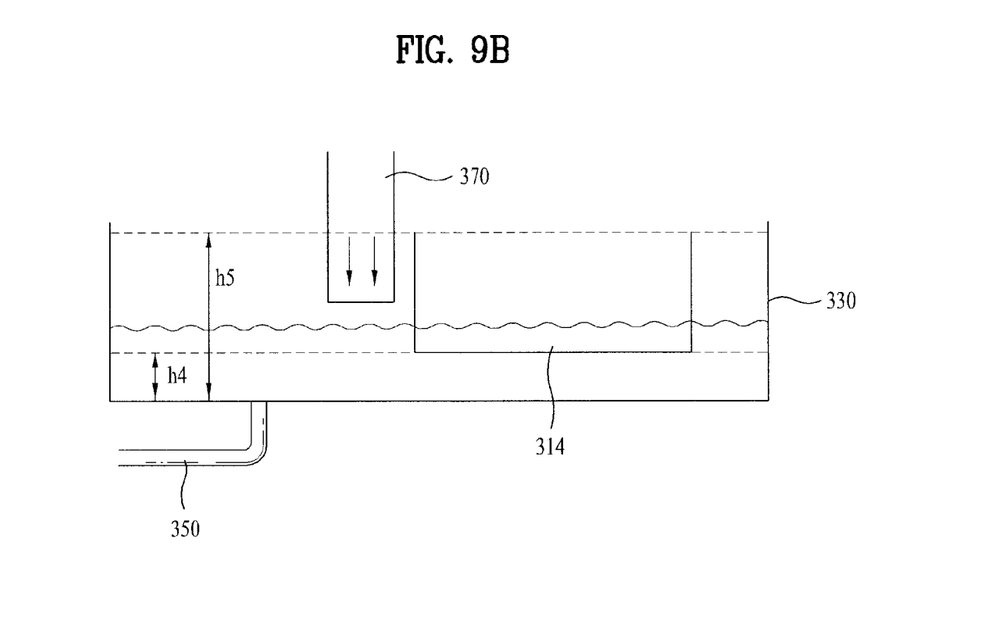

FIGS. 9A-9B illustrate a relationship between the wicking device 310 shown in FIG. 7 and the supply tank 320.

To allow the bent part 312 and the lower end 314 of the wicking device 310 to absorb fluid, the fluid level (A) of the first supply tank 320 and the fluid level (B) of the second supply tank 330 may be kept at a first level (h1) and a level (h4), respectively. Fluid is stored in the first supply tank 320 at a second level (h2) or higher to allow the supply pipe 370 to supply fluid to the second supply tank 330. The fluid level is kept at a third level (h3) in the first supply tank 320 to prevent overflow from the first supply tank 320. Because of that, the fluid level (A) of the first supply tank 320 may be located between the second level (h2) and the third level (h3). Also, the fluid level (B) of the second supply tank 330 may be kept at a fifth level (h5) or lower to prevent overflow. As a result, the fluid level (A) of the first supply tank 320 may be controlled to be between the second and third levels (h2) and (h3), and the fluid level (B) of the second supply tank 330 may be controlled to be kept between the fourth level (h4) and the fifth level (h5).

If the fluid level (A) of the first supply tank 320 reaches the second level (h2) and fluid is supplied via the supply pipe 370 at a normal speed, the fluid level (B) of the second supply tank 330 may be preset to reach the fourth level (h4). Here, the second level (h2), which is the fluid level (A) of the first supply tank 330, may correspond to the fourth level (h4), which is the fluid level (B) of the second supply tank 330. These second and fourth levels (h2) and (h4) allow both the bent portion 312 and the lower end 314 of the wicking device 310 to absorb fluid from the first and second supply tanks 320 and 330, respectively.

Figure 10:
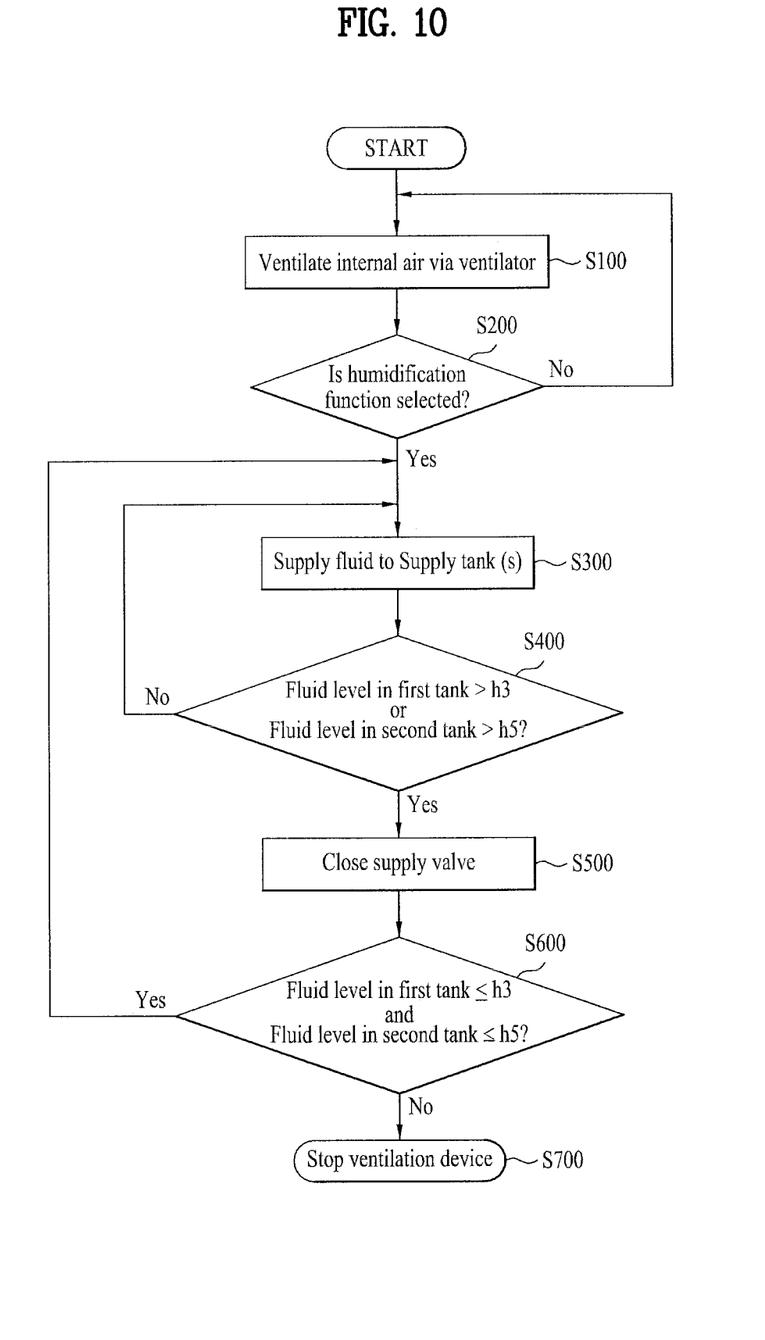
FIG. 10 is a flow a controlling method of a ventilation device as embodied and broadly described herein.

Given the above relationship between the fluid level (A) of the first supply tank 320 and the fluid level (B) of the second supply tank 330, a controlling method that supplies fluid to the humidifier 300 provided in the ventilation device 1000 will be described with reference to FIG. 10.

As mentioned above, the humidification function is possible based on the assumption that the ventilation function is provided. As a result, the controlling method for the ventilation device as embodied and broadly described herein includes a ventilation-operating step (S100) in which internal air is ventilated via the ventilator 100.

In a humidification function determining step (S200) it is determined whether a humidification function is selected or put into operation. If a fluid supply function is selected based on the result of the humidification function determining step, a controller of the ventilation device 1000 opens the supply valve 362 to supply fluid to the first supply tank 320 (S300).

The opening of the supply valve 362 may be controlled to prevent overflow from the first and second supply tanks 320 and 330. A first supply tank fluid level measuring step (S400) may be performed to determine fluid levels of the first and second supply tanks 320 and 330 after opening the supply valve 362, and to determine if the fluid levels meet/exceed the established levels for the first and second supply tanks 320 and 330 as described above. The fluid levels in the supply tanks 320 and 330 may be measured by the sensors 322 and 332.

If at least one of the fluid levels (A) and (B) measured by the sensors 322 and 332 is greater than the corresponding preset level, the supply valve 362 is closed (S500) to finish the supply step. For example, if the fluid level (A) of the first supply tank 320 is greater than the preset third level (h3), because the amount of fluid supplied via the supply pipe 360 is temporarily greater than the amount of fluid supplied via the supply pipe 370 per hour, the supply valve 362 may be closed. Similarly, if the fluid level (B) in the second supply tank 330 is greater than the preset fifth level (h5) the valve 362 may be closed.

After the supply step is finished, with the ventilation operation still in process, the amount of fluid stored in the supply tanks 320 and 330 may decrease.

Because of that, a second fluid level measuring step (S600) may be performed to determine new fluid levels. If it is determined that the fluid levels of the first and second supply tanks 320 and 330 have fallen below the preset third and fifth levels (h3 and h5), respectively, fluid is re-supplied to the supply tank(s) to prevent the fluid levels from falling below the preset first, second and fourth levels (h1, h2 and h4), respectively.

The first and second fluid level measuring steps may be repeated at a preset interval, if the humidification function is put into operation.

After closing the water supply valve 362 (S500), if one or both of the fluid levels (A) and/or (B) of the first and second supply tanks 320 and/or 330 measured in the second fluid level measuring step (S600) is over the corresponding third level (h3) and/or the fifth level (h5), it may be determined that the fluid supply has malfunctioned and operation of the ventilation device 1000 may be stopped.

Stopping the ventilation device 1000 (S700) may include closing the supply valve 362. As a result, if the operation of the ventilation device 1000 is stopped, an alarming step may be performed to provide notification of a malfunction.

A ventilation device and a controlling method of the same are provided.

A ventilation device including a humidification unit having improved humidification efficiency and improved durability, and a controlling method of the same are provided.

A ventilation device as embodied and broadly described herein may include a ventilation unit comprising a heat exchanger heat-exchanging exhausted air from indoor and supplied air from outdoor with each other; and a humidification unit comprising first and second water supply tanks provided at different heights, a water supply pipe connecting the first and second water supply tanks with each other and a humidifying member absorbing water stored in the first or second water supply tank, to enable the supplied air from the ventilation unit to be passed through and to be humidified.

The first water supply tank may be provided higher than the second water supply tank and the water absorbed by the humidifying member may be supplied to the first water supply tank.

The water supply pipe may connect the first and second water supply tanks with each other in a vertical direction and the water supplied to the first water supply tank at a preset water level or higher may be supplied to the second water supply tank via the water supply pipe.

A water supply valve may be provided in a supply pipe supplying water to the first water supply tank and a water level sensor may be provided in at least one of the first and second water supply tanks.

The water supply valve may be closed when the water level of the water supply tank sensed by the water level sensor reaches a preset water level and the water supply valve may be open when the water level of the water supply tank sensed by the water level sensor is below a preset water level.

Water level sensors may be provided in the first and second water supply tanks, respectively, and in case at least one of the water levels of the first and second water supply tanks is over a preset highest water level, with the water supply valve being open, the water supply valve may be closed and in case the water levels of the first and second water supply tanks are below preset lowest water levels, respectively, with the water supply valve being closed, the water supply valve may be open.

The preset lowest water levels of the first and second water supply tanks may be the lowest water level enabling the humidifying member to absorb water from the first and second water supply tanks.

An upper end of the water supply pipe may be higher than the lowest water level of the first water supply tank.

The humidifying member of the humidification unit may include a plurality of corrugated absorbing sheets spaced a predetermined from each other and a plurality of plane absorbing sheets provided between the corrugated absorbing sheets.

The humidifying member may include a bending part extended downward to the inside of the first water supply tank to absorb the water stored in the first water supply tank.

The humidifying member of the humidification unit may have a flat panel shape with respect to a predetermined direction in which the air heat-exchanged in the heat exchanger of the ventilation unit passes.

The first water supply tank may be located on the humidifying member and the first water supply tank may include a plurality of water supply holes formed in a lower surface thereof, spaced apart a predetermined distance from each other in a width direction of the humidifying member, to supply water or at least one slit formed in the lower surface thereof in the width direction of the humidifying member.

The ventilation device may further include a heating/cooling unit evaporating or condensing refrigerant to heat or cool air supplied to the humidification unit.

The heating/cooling unit may include a heating/cooling coil including a plurality of fins and a refrigerant pipe passing through the fins and an expansion valve.

A controlling method of a ventilation device as embodied and broadly described herein may include ventilating internal air by operating a ventilation unit comprising a supply fan and an exhaustion fan; humidifying air supplied by the ventilation unit by supplying water to a humidification unit selectively during the ventilation step; a water-supply-tank-water-level-measuring step configured to measure a water level of a water supply tank composing the humidification unit during the humidifying step; and controlling a water supply valve based on the result of the water supply tank water level measuring step.

The water supply tank water level measuring step may be repeated at a preset internal.

The humidification unit may include first and second water supply tanks provided at different heights, a water supply pipe connecting the first and second water supply tanks with each other and a humidifying member absorbing water stored in the first or second water supply tank, to enable the supplied air from the ventilation unit to be passed through and to be humidified, and in case at least one of the water levels of the first and second water supply tanks measured in the water supply tank water level measuring step is over a preset highest water level, the water supply valve controlling step may close the water supply valve.

In a case in which the water levels of the first and second water supply tanks are over preset lowest water levels, respectively, after the water supply valve is closed, the water supply valve controlling step may open the water supply vale.

In a case in which at least one of the water levels of the first and second water supply tanks measured in the water supply tank water level measuring step is over a preset highest water level after the water supply valve is closed, the water supply valve controlling step may keep the closed state of the water supply valve.

In a ventilation device and a controlling method of the same as embodied and broadly described herein, moisture may be supplied to dry air drawn indoors and internal air may be ventilated simultaneously. As a result, the internal air may be freshened.

Furthermore, durability of the humidifying member included with the humidification unit provided in the ventilation device as embodied and broadly described herein may be improved and water consumption of the humidifying member may be reduced.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A ventilation device, comprising:
a ventilator comprising a heat exchanger that performs heat exchange between exhausted indoor air and supplied external air; and
a humidifier, comprising:
a wicking device humidifying air passing therethrough from the ventilator;
a first supply tank configured to store fluid therein, the first supply tank supplying the fluid stored therein to an upper portion of the wicking device;

a second supply tank configured to store fluid therein, the second supply tank supplying the fluid stored therein to a bottom portion of the wicking device;

a first fluid level sensor provided in the first supply tank and sensing a level of the fluid in the first supply tank;

a second fluid level sensor provided in the second supply tank and sensing a level of the fluid in the second supply tank;

a first supply pipe that connects the first and second supply tanks;

a second supply pipe configured to connect the first supply tank to an external fluid source; and a supply valve provided in the second supply pipe and selectively controlling a supply of fluid to the first supply tank, wherein the supply valve selectively opens and closes the second supply pipe based on the level of the fluid in the first supply tank or the second supply tank sensed by the first fluid level sensor and the second fluid level sensor.

2. The ventilation device of claim 1, wherein the first supply tank is provided at a first height and the second supply tank is provided at a second height, wherein the first height is higher than the second height.

3. The ventilation device of claim 2, wherein the first supply pipe connects the first and second supply tanks in a substantially vertical direction, and wherein fluid supplied to the first supply tank by the second supply pipe in excess of a preset level is supplied from the first supply tank to the second supply tank via the first supply pipe.

4. The ventilation device of claim 1, wherein the supply valve is closed when a fluid level of the first or second supply tank sensed by the at least one fluid level sensor reaches a preset level, and wherein the supply valve is open when the fluid level of the first or second supply tank sensed by the at least one fluid level sensor is below a preset level.

5. The ventilation device of claim 1 wherein, when a fluid level in at least one of the first or second water supply tanks is over a respective preset maximum level and the supply valve is open, the supply valve is closed, and when fluid levels in both the first and second supply tanks are below respective preset minimum levels, and the supply valve is closed, the supply valve is opened.

6. The ventilation device of claim 5, wherein the respective preset minimum levels of the first and second supply tanks correspond to the lowest fluid level therein that allows a corresponding portion of the wicking device to absorb fluid therefrom.

7. The ventilation device of claim 6, wherein an upper end of the first supply pipe is positioned within the first supply tank and is higher than the preset minimum level of the first supply tank.

8. The ventilation device of claim 1, wherein the wicking device of the humidifier comprises:
a plurality of corrugated absorbing sheets spaced apart from each other by a predetermined distance; and
a plurality of planar absorbing sheets each positioned between a pair of adjacent corrugated absorbing sheets.

9. The ventilation device of claim 1, wherein the wicking device comprises an extension that extends downward from a top end portion of the wicking member and into the first supply tank so as to absorb fluid stored in the first supply tank.

10. The ventilation device of claim 9, wherein the second supply tank is positioned below the wicking device such that a bottom end portion of the wicking device extends down into the second supply tank so as to absorb fluid stored in the second supply tank.

11. The ventilation device of claim 10, wherein fluid absorbed by a distal end of the extension positioned in the first supply tank flows in a first direction along the extension toward the top end portion of the wicking member, and then turns and flows in a second direction toward the bottom end portion of the wicking device.

12. The ventilation device of claim 11, wherein fluid absorbed by the bottom end portion of the wicking device flows in the first direction along the wicking device toward the top end portion of the wicking device.

13. The ventilation device of claim 1, wherein the wicking device has a substantially flat panel shape that is positioned in the ventilation device substantially perpendicular to a flow of air received from the heat exchanger.

14. The ventilation device of claim 1, wherein the first supply tank is positioned on the wicking device, and wherein the first supply tank comprises a plurality of supply holes formed in a lower surface thereof, spaced apart a predetermined distance from each other in a width direction of the device, so as to supply fluid from the first supply tank to the wicking device through the plurality of supply holes.

15. The ventilation device of claim 1, further comprising:
a heater/cooler that evaporates/condenses refrigerant so as to heat/cool air to be supplied to the humidifier.

16. The ventilation device of claim 15, wherein the heater/cooler comprises a heating/cooling coil comprising a plurality of fins and a refrigerant pipe passing through the plurality of fins and an expansion valve.

* * * * *